(12) United States Patent
Seki

(10) Patent No.: US 10,984,499 B2
(45) Date of Patent: Apr. 20, 2021

(54) CONTROL DEVICE

(71) Applicant: SUBARU CORPORATION, Tokyo (JP)

(72) Inventor: Junya Seki, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 252 days.

(21) Appl. No.: 16/217,986

(22) Filed: Dec. 12, 2018

(65) Prior Publication Data

US 2019/0244317 A1 Aug. 8, 2019

(30) Foreign Application Priority Data

Feb. 7, 2018 (JP) .............................. JP2018-019928

(51) Int. Cl.
*G08G 1/14* (2006.01)
*G05D 1/00* (2006.01)
(Continued)

(52) U.S. Cl.
CPC ............ *G06Q 50/30* (2013.01); *G05D 1/0011* (2013.01); *G05D 1/0088* (2013.01);
(Continued)

(58) Field of Classification Search
CPC ........ G06Q 50/00; G06Q 50/30; G06Q 10/00; G06Q 10/02; G06Q 10/025; H04W 4/00;
(Continued)

(56) References Cited

U.S. PATENT DOCUMENTS 9,230,232 B2 * 1/2016 McCormick ........... G07C 5/008
10,580,300 B1 * 3/2020 Rosenblatt ............... G08G 1/04
(Continued)

FOREIGN PATENT DOCUMENTS

| JP | 2009-245221 A | 10/2009 |
| JP | 2015-219811 A | 12/2015 |
| JP | 2017-204151 A | 11/2017 |

OTHER PUBLICATIONS

Japanese Notice of Reasons for Refusal issued in corresponding Japanese Patent Application No. 2018-019928, dated Dec. 3, 2019, with English translation.

*Primary Examiner* — Yonel Beaulieu
(74) *Attorney, Agent, or Firm* — McDermott Will & Emery LLP

(57) ABSTRACT

A control device is configured to cause a vehicle parked in a parking lot to move to a pick-up area in accordance with a call from a user of the vehicle. The control device includes a predicted time calculator and a moving-out vehicle determiner. The predicted time calculator is configured to, with regard to the vehicle that has arrived at the pick-up area in response to the call, acquire a user position and calculate a predicted user arrival time on the basis of the user position. The user position is a current position of the user. The predicted user arrival time is a time in which the user is predicted to arrive at the pick-up area. The moving-out vehicle determiner is configured to determine a moving-out vehicle on the basis of the calculated predicted user arrival time. The moving-out vehicle is a vehicle that is to be moved out of the pick-up area.

9 Claims, 9 Drawing Sheets

(51) Int. Cl.
　　　*G05D 1/02*　　　(2020.01)
　　　*G06Q 10/02*　　(2012.01)
　　　*G06Q 50/30*　　(2012.01)
　　　*H04W 4/02*　　(2018.01)
　　　*G07B 15/02*　　(2011.01)
　　　*H04W 4/029*　　(2018.01)
　　　*H04W 4/40*　　(2018.01)

(52) U.S. Cl.
　　　CPC .......... *G05D 1/0285* (2013.01); *H04W 4/027* (2013.01); *H04W 4/029* (2018.02); *H04W 4/40* (2018.02)

(58) Field of Classification Search
　　　CPC ....... H04W 4/02; H04W 4/021; H04W 4/029; H04W 4/40; H04W 4/027; H04W 4/42; H04W 4/48; H04W 4/50; G05D 1/00; G05D 1/0011; G05D 1/0088; G05D 1/0285; G05D 2201/00; G05D 2201/02; G01C 21/00; G01C 21/34; G01C 21/3438; B60W 2440/01; B60W 2440/041; B60W 2440/043; G07B 15/02; G07B 15/063; G07C 5/00; G07C 5/008; G07C 5/02; G07C 5/08; G08G 1/00; G08G 1/14; G08G 1/14–147; G08G 1/202; G08G 1/205
　　　See application file for complete search history.

(56) References Cited

U.S. PATENT DOCUMENTS

| | | | |
|---|---|---|---|
| 10,593,129 B2 * | 3/2020 | Bruce | G07B 15/02 |
| 2015/0294431 A1 * | 10/2015 | Fiorucci | G07B 15/02 |
| | | | 705/13 |
| 2016/0358478 A1 * | 12/2016 | McCormick | G07C 5/008 |
| 2017/0329342 A1 | 11/2017 | Kazama | |
| 2019/0050936 A1 * | 2/2019 | Hachisuka | G06Q 50/10 |
| 2019/0066250 A1 * | 2/2019 | Levy | G01C 21/3438 |
| 2019/0279487 A1 * | 9/2019 | Hirose | G08B 21/24 |

* cited by examiner

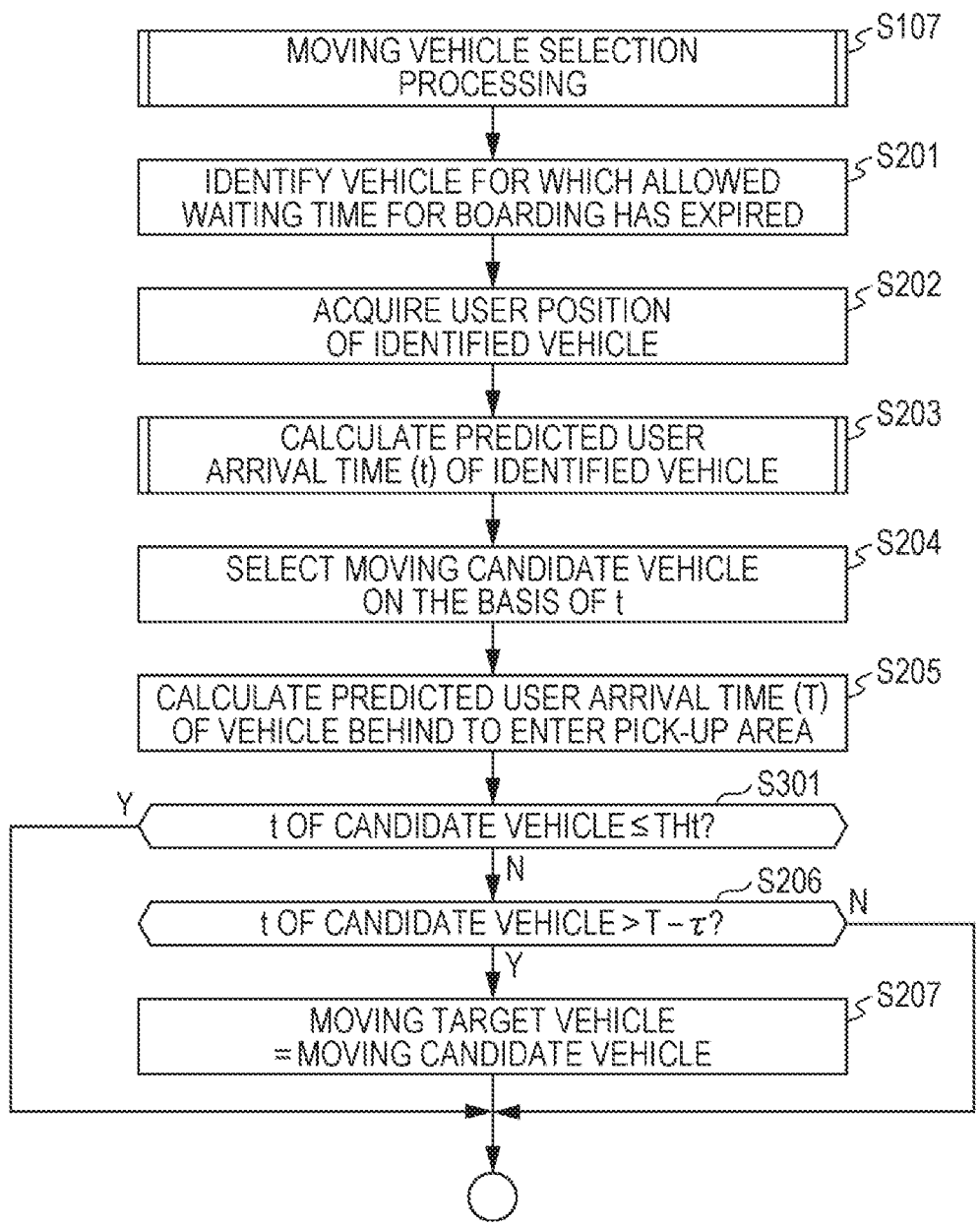

CONTROL DEVICE

CROSS-REFERENCE TO RELATED APPLICATIONS

The present application claims priority from Japanese Patent Application No. 2018-019928 filed on Feb. 7, 2018, the entire contents of which are hereby incorporated by reference.

BACKGROUND

1. Technical Field

The present invention relates to the technical field of control devices that cause a vehicle parked in a parking lot to move to a pick-up area in accordance with a call from a user who is a passenger.

2. Related Art

For example, among systems for assisting in parking vehicles, an automated valet parking system is being considered. The automated valet parking system automates valet parking by utilizing autonomous driving technology for vehicles, and the assumption is that the vehicles are controlled, for example, by a control device, playing a main role, disposed in an establishment that supports valet parking, such as a hotel or a large-scale commercial establishment. Specifically, in the automated valet parking system, a user, who is a passenger (including a driver), stops a vehicle at a predetermined drop-off area and gets off the vehicle. Then, the vehicle moves to a necessary parking lot (parking space) and parks itself through autonomous driving. Thereafter, in response to a call from the user, the control device causes the vehicle to move from the parking lot to a predetermined pick-up area to pick up the user through autonomous driving.

The drop-off area and the pick-up area may be the same area in some cases.

Related technology is disclosed in Japanese Unexamined Patent Application Publication No. 2015-219811 and Japanese Unexamined Patent Application Publication No. 2017-204151.

SUMMARY OF THE INVENTION

An aspect of the present invention provides a control device configured to cause a vehicle parked in a parking lot to move to a pick-up area in accordance with a call from a user who is a passenger of the vehicle. The control device includes a predicted time calculator configured to, with regard to the vehicle that has arrived at the pick-up area in response to the call, acquire a user position and calculate a predicted user arrival time on the basis of the user position, the user position being a current position of the user who has made the call for the vehicle, the predicted user arrival time being a time in which the user is predicted to arrive at the pick-up area; and a moving-out vehicle determiner configured to determine a moving-out vehicle on the basis of the predicted user arrival time calculated by the predicted time calculator, the moving-out vehicle being a vehicle that is to be moved out of the pick-up area.

An aspect of the present invention provides a control device configured to cause a vehicle parked in a parking lot to move to a pick-up area in accordance with a call from a user who is a passenger of the vehicle. The control device includes circuitry. The circuitry is configured to, with regard to the vehicle that has arrived at the pick-up area in response to the call, acquire a user position and calculate a predicted user arrival time on the basis of the user position. The user position is a current position of the user who has made the call for the vehicle. The predicted user arrival time is a time in which the user is predicted to arrive at the pick-up area. The circuitry is configured to determine a moving-out vehicle on the basis of the predicted user arrival time calculated by the predicted time calculator, the moving-out vehicle being a vehicle that is to be moved out of the pick-up area.

BRIEF DESCRIPTION OF THE DRAWINGS

FIG. 11 is a flowchart illustrating moving vehicle selection processing according to a modification.

DETAILED DESCRIPTION

In the following, some preferred examples of the present invention are described in detail with reference to the accompanying drawings. Note that the following description is directed to illustrative instances of the disclosure and not to be construed as limiting to the present invention. Factors including, without limitation, numerical values, dimensions, shapes, materials, components, positions of the components, and how the components are coupled to each other are for purposes of illustration to give an easier understanding of the present invention, and are not to be construed as limiting to the present invention, unless otherwise specified. Further, elements in the following instances which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same minerals to avoid redundant description. Illustration of elements that are not directly related to the present invention is omitted.

Of an automated valet parking system, a system that causes a vehicle in a parking lot to move to a pick-up area to pick up a user in accordance with a call from the user will mainly be described. This system will be referred to as a pick-up system, hereinafter.

A possible issue with the pick-up system is that the time it takes for the user who makes a call to arrive at a pick-up area may differ for different users. A vehicle of a user who arrives late is made to wait for a long time at the pick-up area. In other words, the vehicle may occupy the pick-up area for a long time to pick up the user.

If a vehicle occupies the pick-up area for a long time in this manner, the pick-up area may become congested. If a large number of vehicles occupy the pick-up area for a long time, other vehicles behind may not be allowed to enter the pick-up area. Such a situation forces other users who are not arriving late to wait for a long time at the pick-up area and is thus not desirable.

It is desirable to prevent a situation in which a vehicle that has arrived at a pick-up area occupies the pick-up area for a long time while waiting for the user to arrive and to ease any congestion at the pick-up area.

1. Configuration of Pick-Up System

Figure 1:
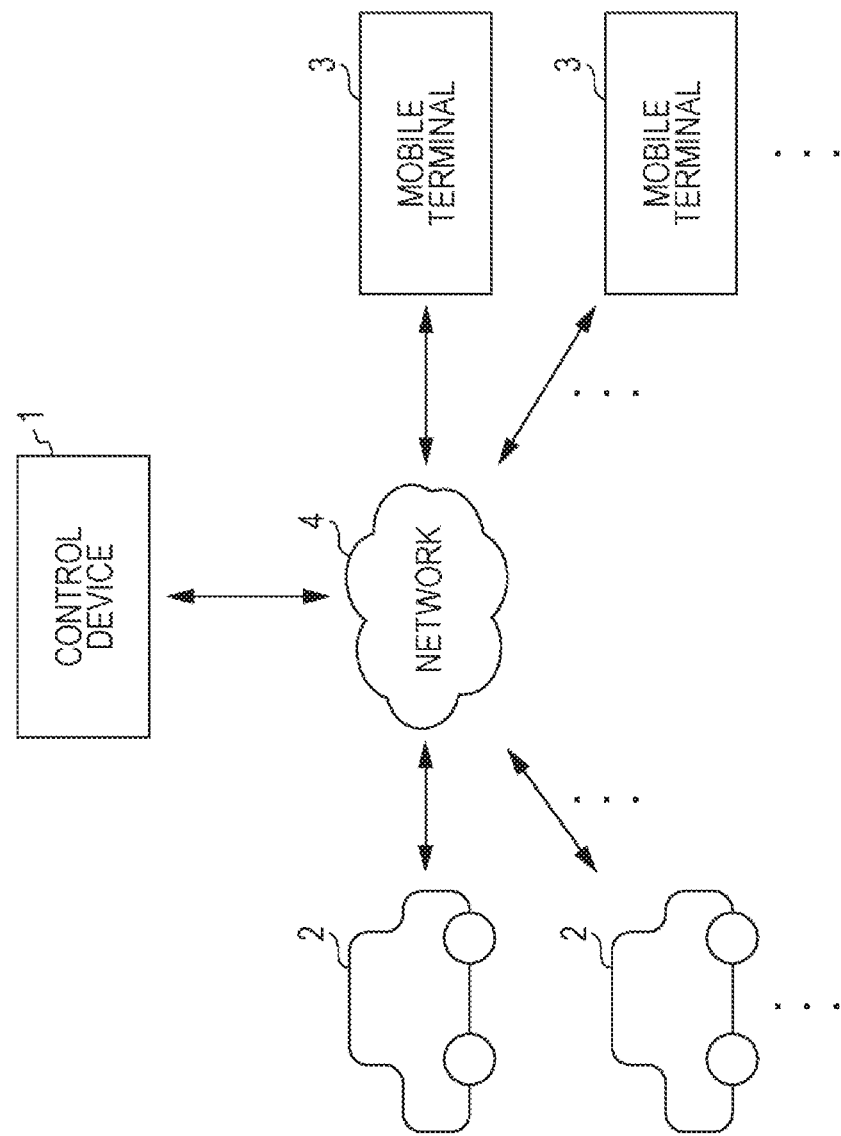
FIG. 1 illustrates a configuration of a pick-up system that includes a control device according to an example.
Figure 2:
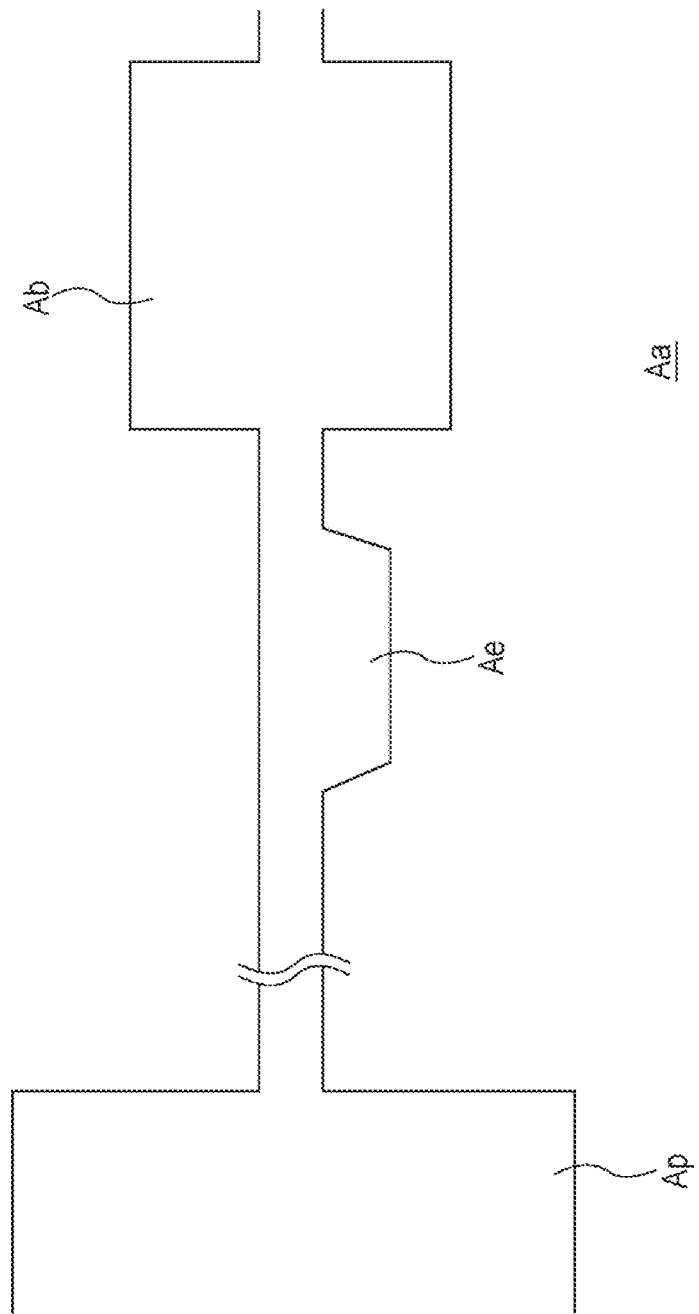
FIG. 2 is a schematic diagram of a vehicle passable region defined in an establishment that supports valet parking to which the pick-up system according to an example is applied.

FIG. 1 illustrates a configuration of a pick-up system that includes a control device 1 according to an example of the present invention, and this pick-up system will be referred to as a pick-up system according to an example, hereinafter. FIG. 2 is a schematic diagram of a vehicle passable region Aa defined in an establishment that supports valet parking to which the pick-up system is applied.

As illustrated in FIG. 1, the pick-up system according to the example includes the control device 1, a plurality of vehicles 2, a plurality of mobile terminals 3, and a network 4. The network 4 is, for example, a communication network, such as the internet or a local area network (LAN). The control device 1 can communicate with the vehicles 2 and the mobile terminals 3 via the network 4. In this example, the vehicles 2 and the mobile terminals 3 can also communicate with each other via the network 4.

The control device 1 is a computer device managed at an establishment that supports valet parking. The vehicles 2 are each a vehicle that a user using the establishment that supports valet parking uses. The mobile terminals 3 are each a mobile computer device used by a user.

As illustrated in FIG. 2, in the vehicle passable region Aa in the establishment that supports valet parking, a parking lot Ap, a pick-up area Ab, and a temporary refuge area Ae are defined. A passage through which the vehicles 2, described later, can pass couples the parking lot Ap and the temporary refuge area Ae to each other and the temporary refuge area Ae and the pick-up area Ab to each other. The vehicles 2 can thus move between the parking lot Ap, the pick-up area Ab, and the temporary refuge area Ae.

A plurality of parking spots are provided in the parking lot Ap, and a plurality of vehicles 2 can be parked in the parking lot Ap. The pick-up area Ab is an area where passengers get on the vehicles 2, and the pick-up area Ab can house a plurality of vehicles in this example. The temporary refuge area Ae is an area that temporarily houses the vehicles that are waiting to enter the pick-up area Ab. The temporary refuge area Ae can house a plurality of vehicles 2 in this example.

A gate having an operable bar, for example, can be provided at an entrance of the pick-up area Ab through which the vehicles 2 enter from the parking lot Ap.

In the automated valet parking system of this example, a vehicle having an autonomous driving function is used as the vehicle 2. A passenger of the vehicle 2 drives the vehicle 2 to a predetermined drop-off area provided in an establishment that supports valet parking. The vehicle 2 may be manually driven or autonomously driven. Upon the user, or the passenger (including the driver), arriving at the drop-off area and getting off the vehicle 2, the vehicle 2 moves and parks itself in the parking lot Ap through autonomous driving in response to, for example, a parking instruction from the user. The parking instruction may be, for example, input to the vehicle 2 or issued to the vehicle 2 via the mobile terminal 3.

At this point, the control device 1 manages information on an available parking spot in the parking lot Ap and instructs the vehicle 2 moving from the drop-off area to the parking lot Ap as described above to park itself in the available parking spot. For example, a parking spot identifier is assigned to each parking spot in such a manner that the vehicle 2 can identify the parking spot. For example, a parking spot number is indicated in each parking spot. The control device 1 manages the availability of each parking spot with the identifiers. Upon receiving the parking spot identifier of an available parking spot from the control device 1, the vehicle 2 parks itself in the parking spot specified by the parking spot identifier through the autonomous driving function.

In the automated valet parking system of this example, the user can instruct the control device 1 to call the user's vehicle 2 in the parking lot Ap (into the pick-up area Ab) by operating the mobile terminal 3.

Upon receiving this calling instruction, the control device 1 instructs the corresponding vehicle 2 to move to the pick-up area Ab to pick up the user at the pick-up area Ab.

A characteristic feature of the present example lies on the system (i.e., the pick-up system) that causes the vehicle 2 parked in the parking lot Ap to move to the pick-up area Ab in response to a calling instruction from the user as described above, and details of this system will be described later.

In the pick-up system according to the example, the number of the vehicles 2 and the number of the mobile terminals 3 may vary depending on the number of system users and may each be one.

2. Configuration of Each Device

Figure 3:
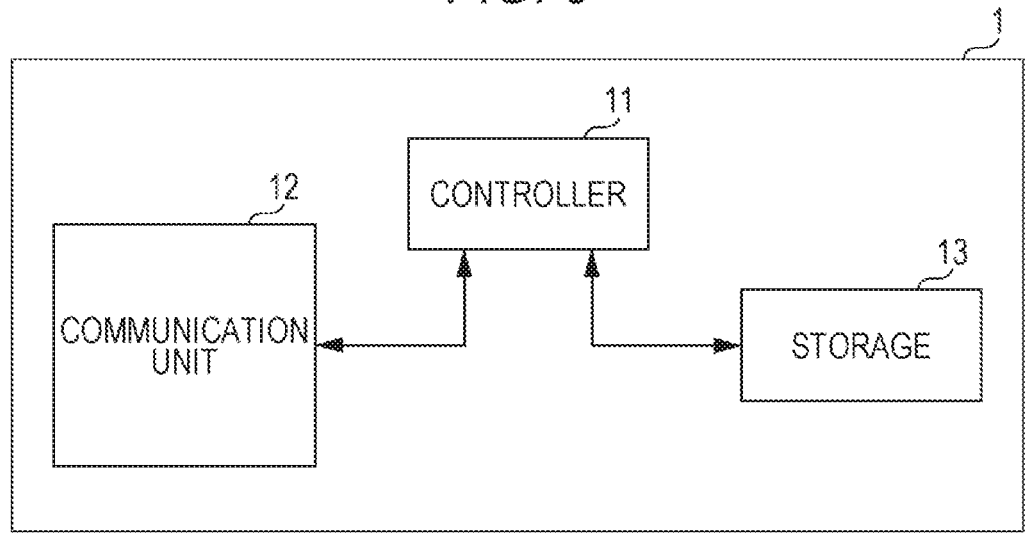
FIG. 3 is a block diagram illustrating an internal configuration example of a control device according to an example.

FIG. 3 is a block diagram illustrating an internal configuration example of the control device 1.

As illustrated in FIG. 3, the control device 1 includes a controller 11, a communication unit 12, and a storage 13. The controller 11 includes a microcomputer having, for example, a central processing unit (CPU), a read-only memory (ROM), and a random-access memory (RAM). A necessary operation of the control device 1 is implemented as the CPU executes processing that is based on a program stored in the ROM.

The communication unit 12 transmits and receives data to and from an external device via the network 4 in accordance with an instruction from the controller 11. Specific examples of the external device include the vehicles 2 and the mobile terminals 3 in the present example. The controller 11 can carry out data communication with the external device via the communication unit 12.

The communication unit 12 and the network 4 may be coupled to each other with a cable or wirelessly.

The storage 13 is constituted, for example, by a storage device, such as a flash memory or a hard disk drive (HDD), and is used for the controller 11 to store various pieces of data. The storage 13 can store, for example, various pieces of data necessary for controlling the vehicle 2, such as data pertaining to available parking spots in the parking lot Ap described above.

Figure 4:
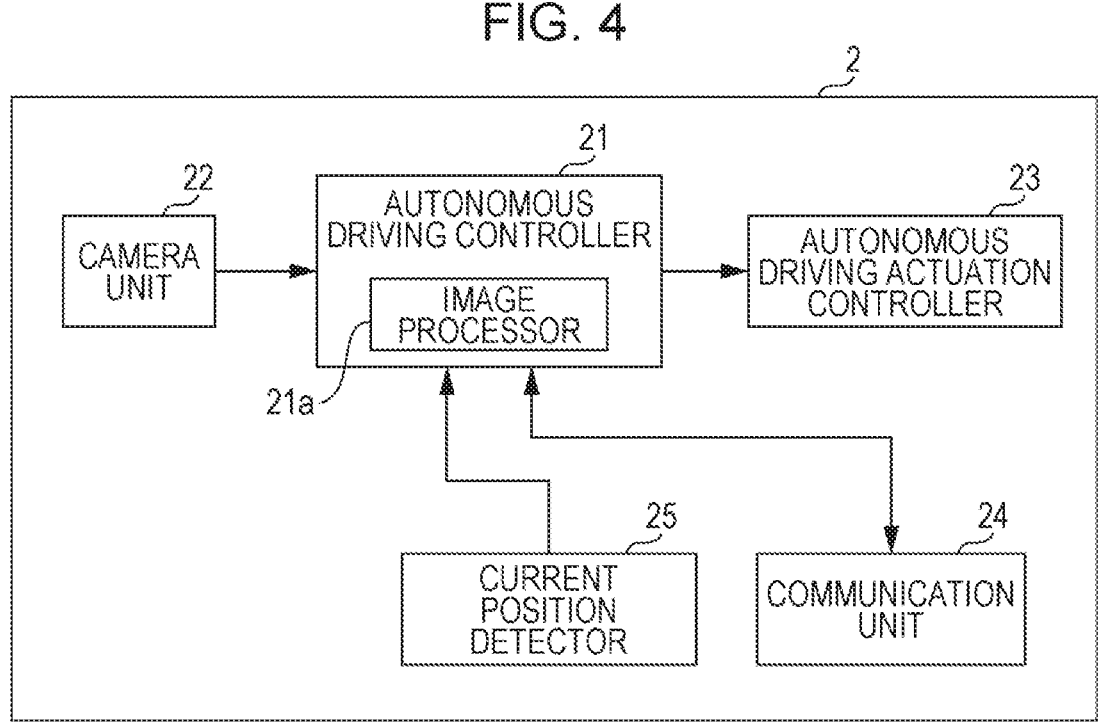
FIG. 4 is a block diagram illustrating an electrical configuration pertaining to autonomous driving included in a vehicle used in an example.

FIG. 4 is a block diagram illustrating an electrical configuration pertaining to autonomous driving provided in the vehicle 2.

The vehicle 2 of this example includes an autonomous driving controller 21, a camera unit 22, an autonomous driving actuation controller 23, a communication unit 24, and a current position detector 25.

The autonomous driving controller 21 includes a microcomputer having a CPU and a memory (storage device), such as a ROM or a RAM. The autonomous driving controller 21 carries out control to implement the autonomous driving function of the vehicle 2. The autonomous driving function herein is a function that implements at least the movement of the vehicle 2 between the drop-off area, the parking lot Ap, the temporary refuge area Ae, and the pick-up area Ab described above and the autonomous parking of the vehicle 2 into a parking spot in the parking lot Ap.

The autonomous driving controller 21 can acquire current position information with the current position detector 25 (e.g., a global navigation satellite system (GNSS) sensor) that detects the current position of the vehicle 2. In addition, map information, for example, is stored in an internal memory, such as the ROM described above, and the autonomous driving controller 21 carries out various control operations for autonomous driving in accordance with the current position information, the map information, and images captured by one or more cameras in the camera unit 22. A camera in the camera unit 22 captures an image in a direction away from the vehicle. The autonomous driving controller 21 includes an image processor 21a, and the image processor 21a analyzes an image captured by the camera in the camera unit 22. Thus, the autonomous driving controller 21 recognizes an environment outside the vehicle. For example, the autonomous driving controller 21 detects an object present outside the vehicle and recognizes the detected object to recognize the environment outside the vehicle. Then, the autonomous driving controller 21 issues various instructions to the autonomous driving actuation controller 23 in accordance with the recognition result on the environment outside the vehicle, the current position information, and the map information. Thus, the autonomous driving controller 21 implements autonomous driving.

The autonomous driving actuation controller 23 inclusively represents a steering control electronic control unit (ECU) that controls actuation of a steering actuator (e.g., an actuator capable of changing a steering angle, such as a power steering motor), a vehicle propulsion control ECU that controls actuation of a vehicle propulsion device-related actuator, a brake control ECU that controls actuation of a brake-related actuator (e.g., a hydraulic control actuator for controlling an output fluid pressure from a brake booster to a master cylinder or a fluid pressure within a brake fluid pipe), and a transmission control ECU that controls actuation of a transmission-related actuator (an actuator for shifting gears or switching between forward and reverse driving).

The vehicle propulsion device-related actuator can, for example, be a throttle actuator that actuates a throttle valve or various actuators related to actuating the engine, such as an injector that carries out fuel injection, in a case in which the vehicle 2 is an engined vehicle or can, for example, be a driving motor in a case in which the vehicle 2 is an electric vehicle.

The autonomous driving controller 21 issues, to the autonomous driving actuation controller 23, an instruction on the steering amount or the like, an instruction related to the vehicle propulsion such as the accelerator position, an instruction on the on/off of the brake, and an instruction on the forward/reverse movement of the vehicle 2 in accordance with the recognition result of the environment outside the vehicle, the current position information of the vehicle 2, and the map information. Thus, the autonomous driving controller 21 implements autonomous driving.

Specific techniques for the autonomous driving control is not directly related to the present invention, and thus detailed descriptions thereof will be omitted.

The communication unit 24 is coupled to the autonomous driving controller 21. The communication unit 24 transmits and receives data to and from an external device via the network 4. Specific examples of the external device include the control device 1 and the mobile terminals 3 in the present example. The autonomous driving controller 21 can carry out data communication with the external device via the communication unit 24.

In this example, the communication unit 24 and the network 4 are coupled to each other wirelessly but can also be coupled to each other with a cable.

The autonomous driving controller 21 is enabled to determine whether a passenger is sitting on a seat. This determination can be made, for example, by a sitting sensor (pressure-sensitive sensor) provided in a seat. Alternatively, the determination can be made by analyzing an image captured by a camera (provided in the camera unit 22, for example) that captures the interior of the vehicle compartment. When the autonomous driving controller 21 determines that a passenger has sat on a seat (i.e., the passenger has boarded the vehicle) after the vehicle has moved from the parking lot Ap to the pick-up area Ab in response to a call from the user, which will be described later, the autonomous driving controller 21 notifies the control device 1 (controller 11) to that effect.

Figure 5:
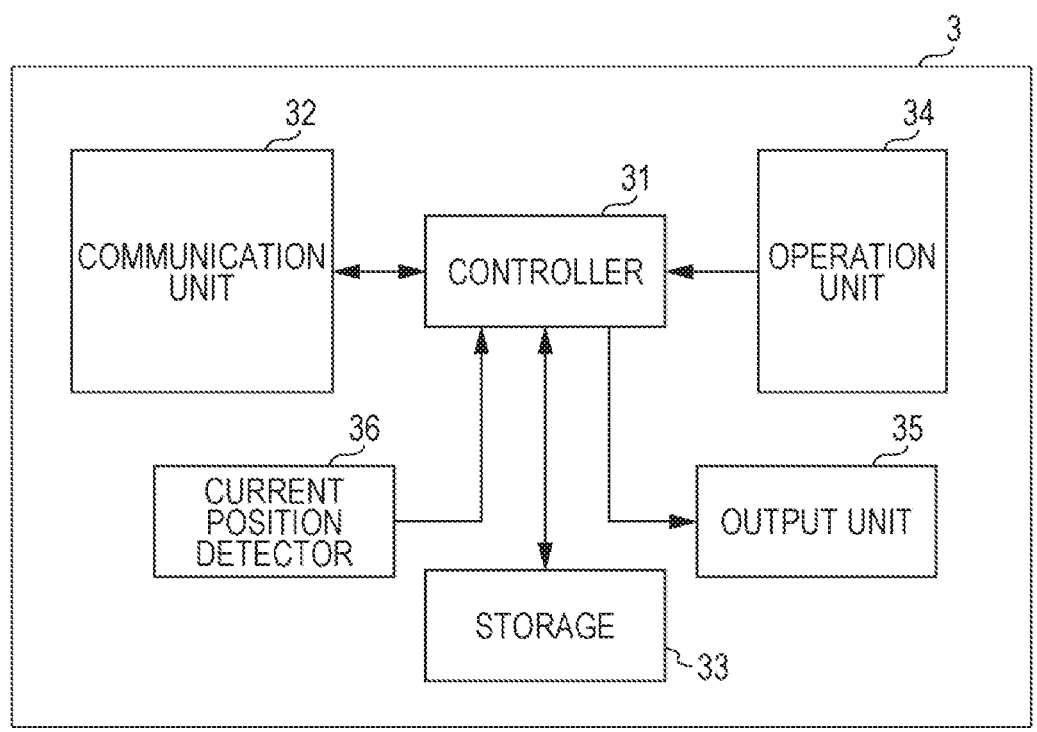
FIG. 5 is a block diagram illustrating an internal configuration example of a mobile terminal used in an example.

FIG. 5 is a block diagram illustrating an internal configuration example of the mobile terminal 3.

The mobile terminal 3 can be, for example, a mobile information processing terminal, such as a mobile phone (e.g., a smartphone) or a tablet terminal.

The mobile terminal 3 includes a controller 31, a communication unit 32, a storage 33, an operation unit 34, an output unit 35, and a current position detector 36.

The controller 31 includes a microcomputer having, for example, a CPU, a ROM, and a RAM. A necessary operation of the mobile terminal 3 is implemented as the CPU executes processing that is based on a program stored in the ROM.

The communication unit 32 transmits and receives data to and from an external device via the network 4 in accordance with an instruction from the controller 31. Specific examples of the external device include the control device 1 and the vehicles 2 in the present example. The controller 31 can carry out data communication with the external device via the communication unit 32.

In this example, the communication unit 32 and the network 4 are coupled to each other wirelessly but can also be coupled to each other with a cable.

The storage 33 is constituted, for example, by a storage device, such as a flash memory or a hard disk drive (HDD), and is used for the controller 31 to store various pieces of data.

The operation unit 34 includes various operators provided in the mobile terminal 3. The operation unit 34 outputs operation information corresponding to an operation to the controller 31. Examples of the operators in the operation unit 34 include various buttons and a touch panel.

The output unit 35 inclusively represents a device for outputting various pieces of information to the user, such as a speaker and various display devices including, for example, a liquid-crystal display or an organic electroluminescence (EL) display provided in the mobile terminal 3.

The output unit 35 outputs various pieces of information (screen display or sound output) in accordance with an instruction from the controller 31.

The current position detector 36 includes, for example, a GNSS sensor and detects a current position of the mobile terminal 3. The controller 31 can acquire current position information detected by the current position detector 36.

In the mobile terminal 3 of this example, an application program for the pick-up system is stored, for example, in a storage device, such as the storage 33, that can be read by the controller 31.

This application for the pick-up system implements a function that provides a calling operation screen for the user to call for the vehicle 2 and provides a rescheduling information input screen for the user to input information on scheduling in response to a rescheduling request, described later, from the control device 1.

In this example, to call the user's vehicle 2 in the parking lot Ap to the pick-up area Ab, the user starts the application for the pick-up system and carries out a predetermined operation on the calling operation screen provided by the stated application.

Although the description through illustration is omitted, the mobile terminal 3 of this example has a function (payment function) of making a payment for a purchase with electronic money. As the payment for a purchase is made with electronic money through this function, the controller 31 can transmit information indicating the purchase price (monetary amount paid for the purchase) to the control device 1 (controller 11) via the communication unit 32.

Processing carried out by the control device 1 on the basis of the information on the monetary amount paid for the purchase will be described later.

3. Method of Identifying Vehicle to be Called

In the pick-up system according to the example, when receiving a call from the user (mobile terminal 3), the control device 1 identifies the vehicle 2 of the user who has made the call among the vehicles 2 in the parking lot Ap and instructs the identified vehicle 2 to move to the pick-up area Ab.

To achieve this, the control device 1 (controller 11) needs to grasp the correspondence relationship between the users and the vehicles 2. Various techniques are conceivable for the control device 1 to grasp the correspondence relationship, and there is no particular limitation on a specific technique. One example of the techniques will be illustrated below.

First, the vehicle 2 (autonomous driving controller 21) makes an inquiry to the control device 1 as to an available parking spot when moving to the parking lot Ap in accordance with a parking instruction from the user.

At this point, the control device 1 acquires, from the vehicle 2, predetermined vehicle information that allows the vehicle 2 to be uniquely identified, such as the vehicle identification number of the vehicle 2 (hereinafter, referred to as "vehicle identification information"). Thus, the control device 1 can grasp the vehicle identification information of the parked vehicles in the respective parking spots.

Meanwhile, the user sets the vehicle identification information of the user's vehicle 2 into the application for the pick-up system described above as initial setting or the like of the application. Then, when calling the vehicle 2, the application for the pick-up system transmits, to the control device 1, the set vehicle identification information along with information of the calling instruction.

Thus, the control device 1 can identify the vehicle 2 to be called on the basis of the vehicle identification information when the vehicle 2 is called.

4. Pick-Up Control Processing of Example

Hereinafter, pick-up control processing, serving as an example, executed by the control device 1 will be described with reference to FIGS. 6 to 10. The pick-up control processing is related to how a corresponding vehicle 2 is moved in response to a call from the user.

Figure 6:
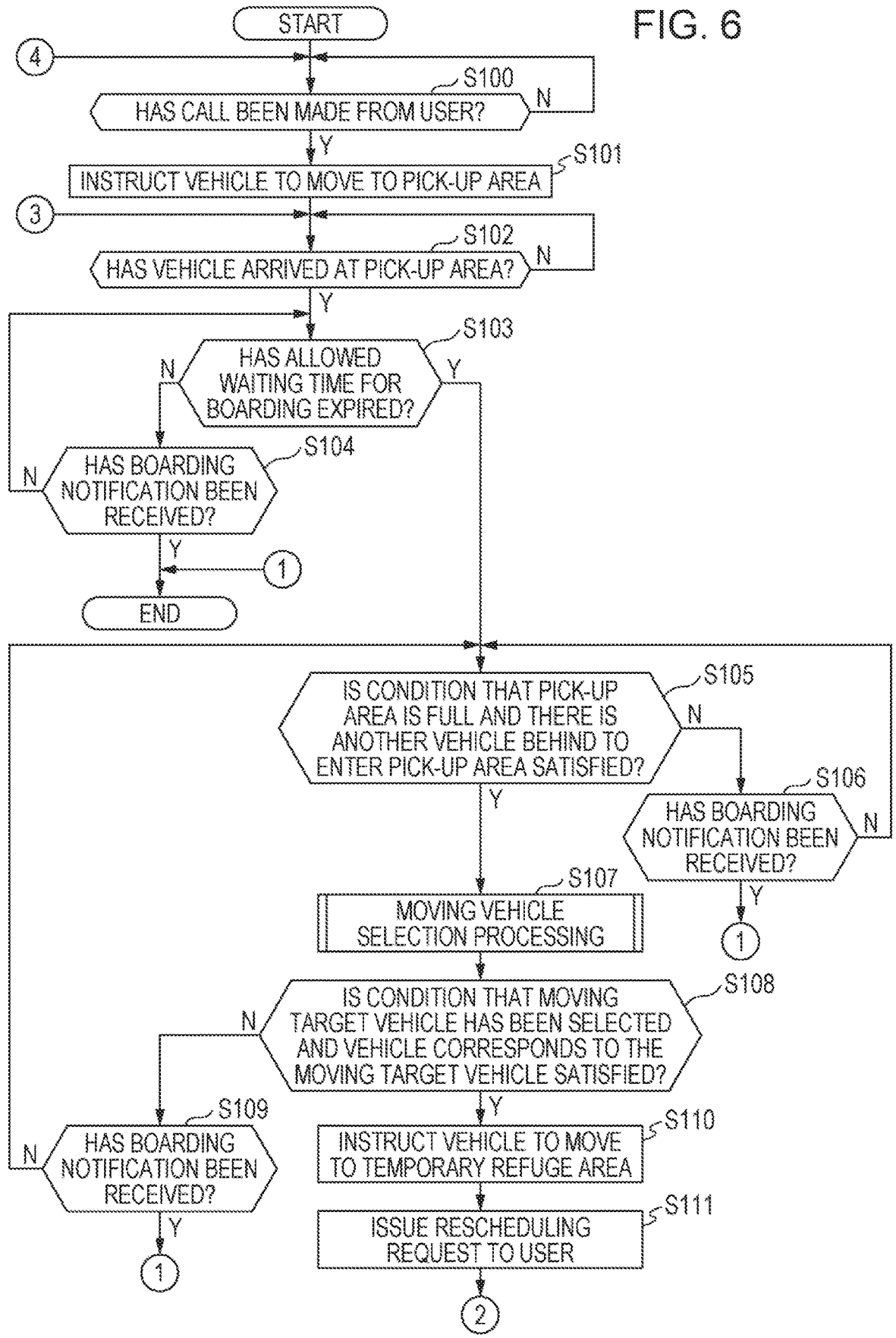
FIG. 6 is a flowchart illustrating a flow of pick-up control processing according to an example.
Figure 7:
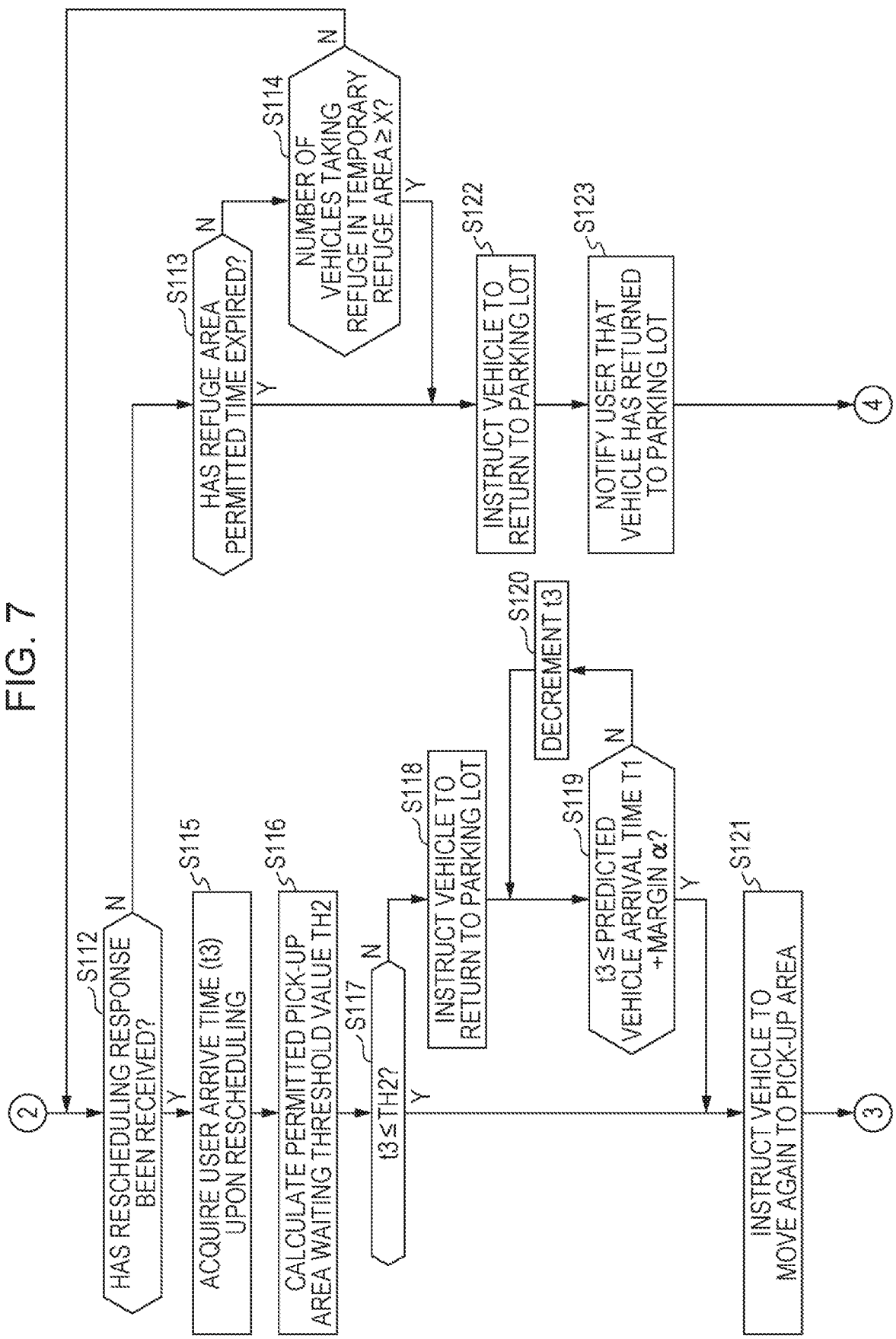
FIG. 7 is a flowchart illustrating, continuing from FIG. 6, a flow of the pick-up control processing according to the example.
Figure 8:
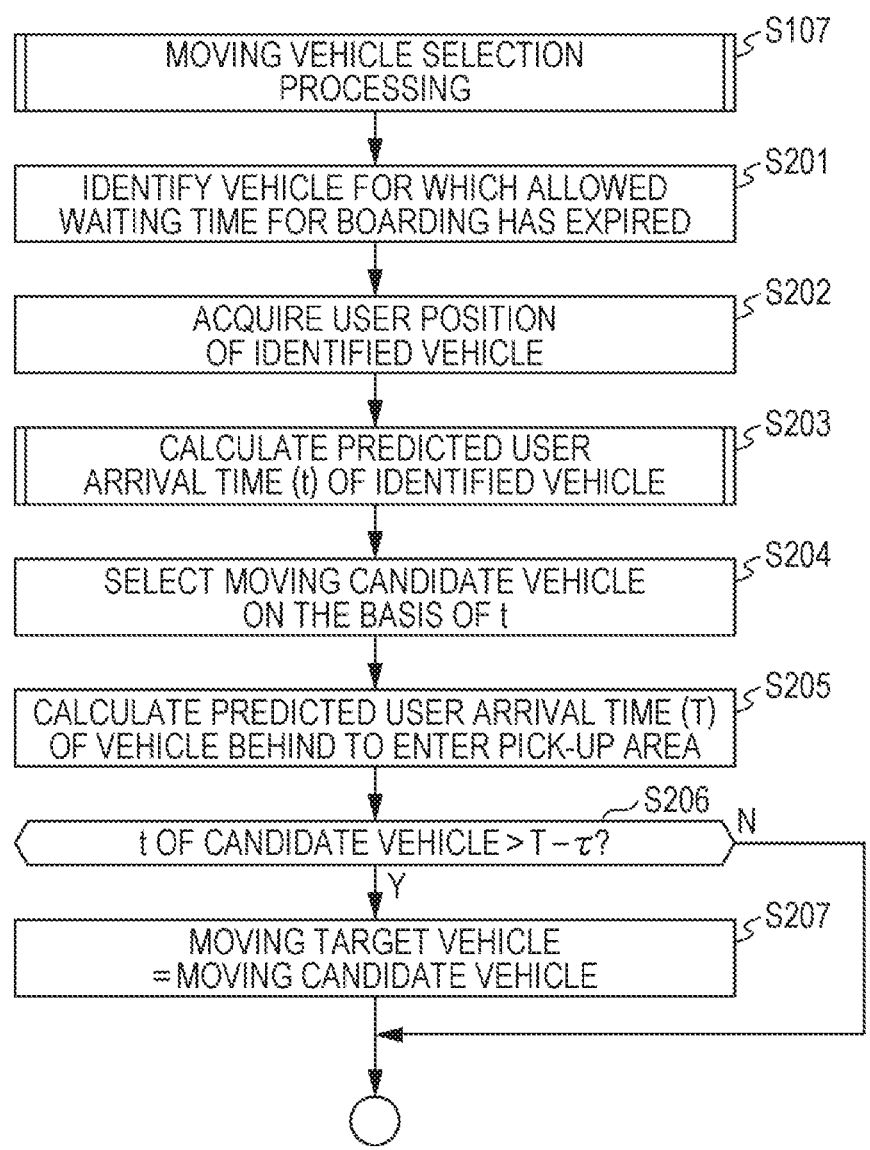
FIG. 8 is a flowchart illustrating moving vehicle selection processing according to an example.
Figure 9:
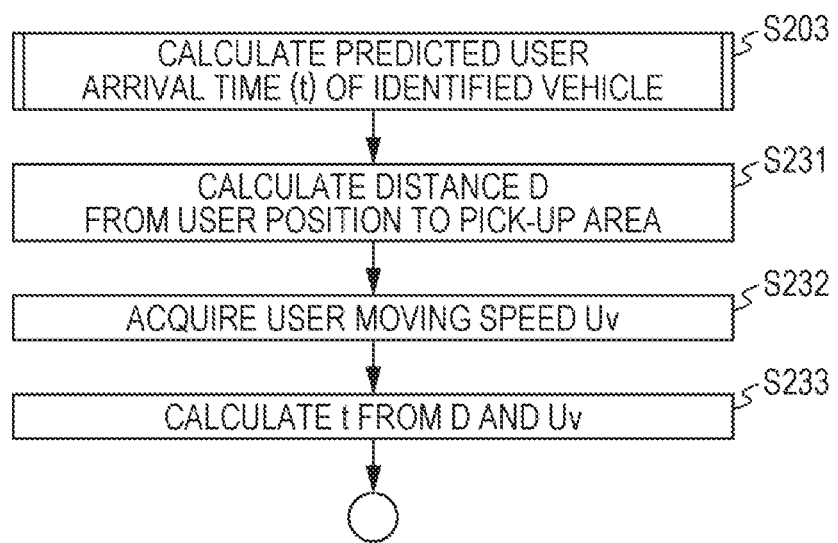
FIG. 9 is a flowchart illustrating processing of calculating a predicted user arrival time of an identified vehicle according to an example.

FIGS. 6 and 7 are flowcharts illustrating a flow of the pick-up control processing according to an example. FIG. 8 is a flowchart of moving vehicle selection processing executed during the pick-up control processing, and FIG. 9 is a flowchart of processing of calculating a predicted user arrival time of an identified vehicle executed during the moving vehicle selection processing. The processing illustrated in FIGS. 6 to 9 is executed by the CPU of the controller 11 in accordance with a program stored, for example, in the ROM or the like described above.

The controller 11 executes the processing illustrated in FIGS. 6 to 9 for each vehicle 2 that uses the pick-up system according to the example.

With reference to FIG. 6, in step S100, the controller 11 stands by for a call from the user. Specifically, the controller 11 stands by for a calling instruction from the user via the mobile terminal 3.

If there is a call from the user, in step S101, the controller 11 instructs the vehicle 2 to move to the pick-up area Ab.

Upon receiving the moving instruction in step S101, the vehicle 2 starts moving to the pick-up area Ab from the parking lot Ap through the autonomous driving function. In this example, the vehicle 2 (autonomous driving controller 21) notifies the control device 1 (controller 11) of the arrival upon arriving at the pick-up area Ab. In the vehicle 2, the arrival at the pick-up area Ab can be detected on the basis of a recognition result of the environment outside the vehicle 2 recognized with the use of an image captured by the camera unit 22, for example.

In step S102 following step S101, the controller 11 stands by until the vehicle 2 arrives at the pick-up area Ab. In other words, the controller 11 waits for notification of the arrival at the pick-up area Ab from the vehicle 2 as described above.

Upon the vehicle 2 arriving at the pick-up area Ab, in step S103, the controller 11 determines whether an allowed waiting time for boarding has expired. Specifically, the controller 11 determines whether the waiting time at the pick-up area Ab of the vehicle 2 that has arrived at the pick-up area Ab (the time that has elapsed from the arrival at the pick-up area Ab) has exceeded a time set as the allowed waiting time for boarding. The allowed waiting time for boarding may be determined in accordance with the size of the pick-up area Ab (the number of vehicles 2 that can be housed in the pick-up area Ab) or the like.

If it is determined in step S103 that the allowed waiting time for boarding has not expired, the controller 11, proceeding to step S104, determines whether a boarding notification has been received from the vehicle 2.

As described above, when the vehicle 2 of this example determines that a passenger has boarded the vehicle 2 after the vehicle 2 has moved to the pick-up area Ab in response to a call, the vehicle 2 notifies the controller 11 to that effect. The processing in step S104 determines whether such a notification has been received.

If it is determined in step S104 that no boarding notification has been received, the controller 11 returns to step S103. In other words, within the allowed waiting time for boarding, the controller 11 continues to wait for the user to board the vehicle 2 that has arrived at the pick-up area Ab.

Meanwhile, if a boarding notification has been received, the controller 11 terminates the series of processing illustrated in FIGS. 6 and 7. In other words, this case indicates that the passenger has arrived at the pick-up area Ab and boarded the vehicle 2 within the allowed waiting time for boarding, and this is thus not a case that causes congestion at the pick-up area Ab. Therefore, the pick-up control processing for this vehicle 2 is terminated.

If it is determined in step S103 that the allowed waiting time for boarding has expired, the controller 11, proceeding to step S105, determines whether the condition that the pick-up area Ab is full and there is another vehicle behind to enter the pick-up area is satisfied.

That the pick-up area Ab is full means that the number of vehicles 2 waiting in the pick-up area Ab has reached the number of vehicles 2 that can be housed in the pick-up area Ab (allowed number of waiting vehicles). A vehicle that is behind to enter the pick-up area means a vehicle 2 that is scheduled to enter the pick-up area Ab at a later time. The controller 11 can grasp whether these is such a vehicle 2 on the basis of whether the controller 11 has instructed any other vehicle 2 to move to the pick-up area Ab (in S101) in the processing illustrated in FIGS. 6 and 7 carried out for other vehicles 2.

If it is determined in step S105 that the condition that the pick-up area Ab is full and there is another vehicle behind to enter the pick-up area is not satisfied, the controller 11, proceeding to step S106, determines whether a boarding notification has been received from the vehicle 2. If no boarding notification has been received, the controller returns to step S105. In other words, through the processing in steps S105 and S106, with regard to the vehicle 2 for which the allowed waiting time for boarding has expired, the controller 11 either stands by until the condition that the pick-up area Ab is full and there is another vehicle behind to enter the pick-up area is satisfied or waits for a boarding notification from the vehicle 2.

If a boarding notification has been received in step S106, the controller 11 terminates the series of processing illustrated in FIGS. 6 and 7.

As can be understood from the processing thus far, in this example, even if the vehicle 2 that has arrived at the pick-up area Ab is waiting beyond the allowed waiting time at the pick-up area Ab (Y in S103) and the pick-up area Ab is full, if there is no other vehicle behind to enter the pick-up area Ab (N in S105), the vehicle 2 is allowed to continue to wait in the pick-up area Ab. Then, if a passenger boards the vehicle 2 waiting in this state (Y in S106), the pick-up control processing for this vehicle 2 is terminated.

Meanwhile, if it is determined in step S105 that the condition that the pick-up area Ab is full and there is another vehicle behind to enter the pick-up area is satisfied, the controller 11, proceeding to step S107, executes moving vehicle selection processing. The moving vehicle selection processing functions as processing of determining whether to move the vehicle 2 in the pick-up area Ab to the outside of the pick-up area Ab on the basis of a result of comparing the predicted user arrival time of the vehicle 2 waiting in the pick-up area Ab with the predicted user arrival time of the vehicle that is behind to enter the pick-up area.

The moving vehicle selection processing (S107) will be described with reference to the flowchart illustrated in FIG. 8.

In step S201, the controller 11 identifies the vehicle 2 for which the allowed waiting time for boarding has expired. Specifically, the controller 11 identifies any vehicle 2 for which the allowed waiting time for boarding has expired among the vehicles 2 waiting in the pick-up area Ab that is full.

In step S202, the controller 11 acquires a user position of an identified vehicle (a vehicle 2 identified in S201, the same applies hereinafter). The user position is the current position information detected by the current position detector 36 of the mobile terminal 3.

In step S203 following step S202, the controller 11 calculates a predicted user arrival time t of the identified vehicle. The predicted user arrival time t is a predicted time in which the user arrives at the pick-up area Ab from the current position of the user (the user position acquired in S202).

As illustrated in FIG. 9, in calculating the predicted user arrival time t of the identified vehicle (S203), in step S231, the controller 11 calculates a distance D from the user position to the pick-up area Ab. The user position is the user position of the identified vehicle acquired in step S202. The positional information of the pick-up area Ab is stored in advance in the ROM or the like of the controller 11, for example.

In step S232, the controller 11 acquires a user moving speed Uv.

For the user moving speed Uv, a value common to all the users can be used, or a value corresponding to the user of the identified vehicle can be used. In one example, for the value of the user moving speed Uv, a value common to all the users (i.e., a fixed value), such as 5 km/h (typical walking speed), is used.

With regard to the user moving speed Uv, various techniques are conceivable in determining what type of value to be used, and a value learned for each user can, for example, be used. Other examples will be described later.

In step S233, the controller 11 calculates the predicted user arrival time t from the distance D and the user moving speed Uv. Specifically, the controller 11 calculates the predicted user arrival time t from "D/Uv."

Upon executing the calculation processing in step S233, the controller 11 finishes the calculation processing of the predicted user arrival time t of the identified vehicle and proceeds to step S204 of FIG. 8.

With reference to FIG. 8, in step S204, the controller 11 selects a moving candidate vehicle on the basis of the predicted user arrival time t.

Specifically, the controller 11 selects, from one or more identified vehicles waiting in the pick-up area Ab, a vehicle 2 with the lastmost (longest) predicted user arrival time t as the moving candidate vehicle. When there are a plurality of vehicles 2 with the lastmost predicted user arrival time t, the controller 11 selects the vehicle 2 that has waited the longest at the pick-up area Ab as the moving candidate vehicle.

In step S205, the controller 11 calculates a predicted user arrival time T of the vehicle that is behind to enter the pick-up area. Specifically, the controller 11 acquires the user position of the vehicle that is behind to enter the pick-up area and calculates the predicted user arrival time T at the pick-up area Ab on the basis of the acquired user position. The technique for calculating the predicted user arrival time T is similar to the calculation technique in step S203 except that the user position of the vehicle that is behind to enter the pick-up area is used as the user position. Thus, duplicate description thereof will be omitted.

In step S206 following step S205, the controller 11 determines whether "the predicted user arrival time t of the moving candidate vehicle" is greater than "the predicted user arrival time T of the vehicle that is behind to enter the pick-up area–an offset time $\tau$" (whether "t>T–$\tau$" holds).

If the determination result in step S206 affirms that "t>T–$\tau$" holds, in step S207, the controller 11 selects the moving candidate vehicle as a "moving target vehicle." Specifically, the controller 11 selects the moving candidate vehicle as the "moving target vehicle" to be moved out of the pick-up area Ab (i.e., a moving-out vehicle to be moved out of the pick-up area Ab).

Meanwhile, if the determination result in step S206 negates that "t>T–$\tau$" holds, the controller 11, skipping step S207, terminates the moving vehicle selection processing in step S107.

Figure 10:
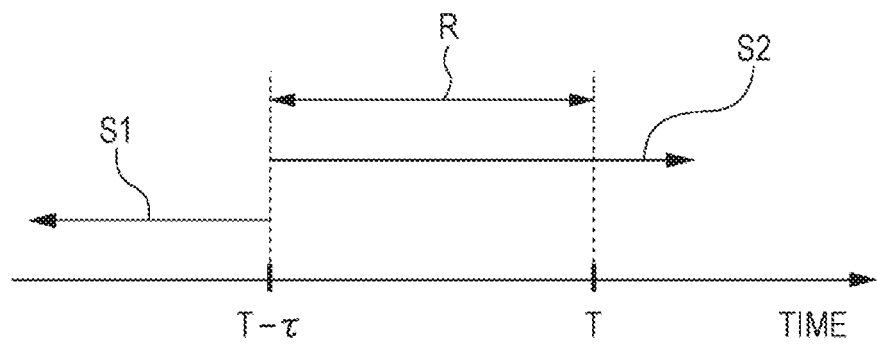
FIG. 10 is an illustration for describing an instance of a technique for selecting a moving target vehicle according to an example.

With reference to FIG. 10, the technique for selecting the moving target vehicle in this example will be described.

In step S206, whether "t>T–$\tau$" holds is determined. Therefore, when the predicted user arrival time t of the moving candidate vehicle is within the range indicated by an arrow S1 in FIG. 10, that is, when the stated predicted user arrival time t has a value within the range no greater than "T–$\tau$" the selection processing of step S207 is not executed, and the moving candidate vehicle is not selected as the moving target vehicle to be moved out of the pick-up area Ab. In other words, the moving candidate vehicle is allowed to continue to wait in the pick-up area Ab. Meanwhile, when the predicted user arrival time t of the moving candidate vehicle is within the range indicated by an arrow S2 in FIG. 10, that is, when the stated predicted user arrival time t has a value within the range greater than "T–$\tau$," the selection processing of step S207 is executed, and the moving candidate vehicle is selected as the moving target vehicle to be moved out of the pick-up area Ab.

The range indicated by a double-headed arrow R in FIG. 10 is a range that is greater than "T–$\tau$" and smaller than "T." When the predicted user arrival time t of the moving candidate vehicle falls within the range indicated by the double-headed arrow R, the predicted user arrival time t of the moving candidate vehicle is shorter than the predicted user arrival time T of the vehicle that is behind to enter the pick-up area Ab, but the difference therebetween is shorter than the offset time $\tau$. In such a circumstance, it is determined that "t>T–$\tau$" holds in step S206 in this example. Thus, the moving candidate vehicle is selected as the moving target vehicle. In other words, the moving candidate vehicle is moved out of the pick-up area Ab (although the user arrival timing of the vehicle that is behind to enter the pick-up area Ab comes later) when it is predicted that the user arrival timing of the moving candidate vehicle comes earlier than the user arrival timing of the vehicle that is behind to enter the pick-up area Ab but the difference therebetween is shorter than the offset time $\tau$.

With regard to the vehicle 2 that has been selected as the moving candidate vehicle, its allowed waiting time for boarding has already expired, and it is well predictable that the user of that vehicle 2 may arrive at the pick-up area Ab further behind the schedule. Therefore, allowing such a vehicle to continue to wait in the pick-up area Ab is not desirable in terms of preventing congestion at the pick-up area Ab. In consideration of this point, even if it is predicted that the user arrival timing of the moving candidate vehicle comes earlier than the user arrival timing of the vehicle that is behind to enter the pick-up area Ab, if the difference therebetween is less than a prescribed value (t), the moving candidate vehicle is moved out of the pick-up area Ab.

Upon executing the processing of step S207 or in response to obtaining the negating result in step S206, the controller 11 proceeds to the processing in step S108 illustrated in FIG. 6.

With reference to FIG. 6, in step S108, the controller 11 determines whether the condition that the moving target vehicle has been selected and the vehicle 2 corresponds to the moving target vehicle is satisfied. Specifically, the controller 11 determines whether the moving target vehicle has been selected through the processing in step S107 and whether the vehicle 2 called in step S100 corresponds to the selected moving target vehicle.

If it is determined that the condition that the moving target vehicle has been selected and the vehicle 2 corresponds to the moving target vehicle is not satisfied, the controller 11, proceeding to step S109, determines whether a boarding notification has been received from the vehicle 2. If a boarding notification has been received, the controller 11 terminates the pick-up control processing illustrated in FIGS. 6 and 7. If no boarding notification has been received, the controller 11 returns to the determination processing in step S105. As can be understood from the flow of steps S105→S106→S107→S108→S109→S105 described thus far, in this example, after it is determined in step S105 that the pick-up area Ab is full and there is another vehicle behind to enter the pick-up area, the processing for selecting the moving target vehicle from the vehicles 2 waiting in the pick-up area Ab is carried out (S107). If, as a result of this processing, the condition that the moving target vehicle has been selected and this moving target vehicle is the target vehicle 2 is not satisfied (N in S108), that is, if no moving target vehicle has been selected or if the selected moving target vehicle is not the target vehicle 2, it is determined whether a boarding notification has been received from the target vehicle 2 (S109). If no boarding notification has been received, the processing returns to the determination as to whether the condition that the pick-up area Ab is full and there is another vehicle behind to enter the pick-up area Ab is satisfied (S105).

Even if a moving target vehicle has been selected, if the selected moving target vehicle is not the target vehicle 2, the determination result in step S105 can be negative. This is because the moving target vehicle is moved from the pick-up area Ab. In this case, the moving vehicle selection processing of step S107 is executed again when no boarding notification is received from the target vehicle 2 (N in S106) and when the determination result affirming that the pick-up area Ab is full and there is a vehicle behind to enter the pick-up area Ab is obtained again in step S105.

Meanwhile, if no moving target vehicle is selected, there is no vehicle 2 to be moved from the pick-up area Ab. Therefore, an affirmative determination result is obtained in step S105, and the moving vehicle selection processing of step S107 is executed again. In this case, until the target vehicle 2 or another vehicle 2 is selected as a moving target vehicle, that is, until space becomes available in the pick-up area Ab (or a state is achieved in which no more vehicle is behind to enter the pick-up area Ab after some other vehicle has entered the pick-up area Ab and the pick-up area Ab has become full), the moving vehicle selection processing of step S107 is repeated (on condition that there is no boarding notification in step S109 as well).

If it is determined in step S108 that the condition that the moving target vehicle has been selected and the vehicle 2 corresponds to the moving target vehicle is satisfied, in step S110, the controller 11 instructs the vehicle 2 to move to the temporary refuge area Ae.

Then, in step S111, the controller 11 issues a rescheduling request to the user. Specifically, the controller 11 transmits a request prompting the user to input schedule information regarding the arrival at the pick-up area Ab to the mobile terminal 3 of the user who has made the call.

The user of the vehicle 2 selected as the moving target vehicle has not arrived yet, and thus the controller 11 requests the user to input schedule information regarding the arrival at the pick-up area Ab.

Upon receiving the rescheduling request, the mobile terminal 3 (controller 31) displays an input screen for inputting the schedule information in the display device of the output unit 35 through a function of the application for the pick-up system described above. If the schedule information is input to the input screen, the mobile terminal 3 transmits the schedule information to the controller 11.

In this example, as the schedule information, one of the time at which the user is scheduled to arrive at the pick-up area Ab and the time in which the user is scheduled to arrive at the pick-up area Ab (an expected value of the time it takes for the user to arrive) is input.

Upon executing the processing in step S111, the controller 11 proceeds to step S112 illustrated in FIG. 7.

With reference to FIG. 7, in step S112, the controller 11 determines whether a rescheduling response has been received, that is, whether the schedule information has been received from the mobile terminal 3. If no rescheduling response has been received (if no schedule information has been received), in step S113, the controller 11 determines whether a refuge area permitted time has expired, that is, whether the waiting time of the vehicle 2 that has moved to the temporary refuge area Ae has exceeded the refuge area permitted time set in advance.

If it is determined in step S113 that the refuge area permitted time has not expired, in step S114, the controller 11 determines whether the number of vehicles taking refuge in the temporary refuge area Ae is no smaller than "x," that is, whether the number of vehicles taking refuge has reached a prescribed value x. If the number of the vehicles taking refuge is smaller than "x," the controller 11 returns to step S112.

The processing in step S112 to S114 forms a loop in which the controller 11 stands by until one of the following conditions is met: the rescheduling response has been received, the refuge area permitted time has expired, and the number of vehicles taking refuge in the temporary refuge area Ae is no smaller than "x." The vehicle 2 waits in the temporary refuge area Ae during this loop.

Temporarily moving the vehicle 2 that is the moving target vehicle to the temporary refuge area Ae allows the vehicle 2 to wait outside the pick-up area Ab without being made to wait on the passage or without being made to return to the parking lot Ap.

If it is determined in step S112 that the rescheduling response has been received, the controller 11, proceeding to step S115, acquires a user arrival time t3 upon rescheduling. For example, when the schedule information described above is information on the time at which the user is scheduled to arrive at the pick-up area Ab, the time difference between the scheduled arrival time and the current time is acquired as the user arrival time t3. Alternatively, when the schedule information is the time in which the user is scheduled to arrive at the pick-up area Ab, this time is acquired as the user arrival time t3.

Then, in step S116, the controller 11 calculates a permitted pick-up area waiting threshold value TH2. The permitted pick-up area waiting threshold value TH2 is calculated by adding "the allowed waiting time for boarding" to "the time it takes for the vehicle 2 to move from the temporary refuge area Ae to the pick-up area Ab." A fixed value is used for "the time it takes for the vehicle 2 to move from the temporary refuge area Ae to the pick-up area Ab" in this example. "The allowed waiting time for boarding" is, for example, a value determined in accordance with the size or the like of the pick-up area Ab, as described above, and is set to 5 to 10 minutes, for example.

In step S117 following step S116, the controller 11 determines whether the user arrival time t3 upon rescheduling is no greater than the permitted pick-up area waiting threshold value TH2 (whether "t3≤TH2" holds). This determination corresponds to determining whether the waiting time until the user arrival exceeds the allowed waiting time at the pick-up area Ab if the vehicle 2 is allowed to enter the pick-up area Ab at the current moment.

If "t3≤TH2" holds in step S117, in step S121, the controller 11 instructs the vehicle 2 to move again to the pick-up area Ab. In other words, when the user is expected to arrive soon on the basis of the user arrival time t3 upon rescheduling, the vehicle 2 in the temporary refuge area Ae is moved again to the pick-up area Ab.

Upon instructing the vehicle 2 to move again in step S121, the controller 11 returns to step S102 illustrated in FIG. 6. Thus, whether the vehicle 2 that has moved again to the pick-up area Ab has arrived at the pick-up area Ab again is monitored (S102), and the processing in step S103 and thereafter is executed again when the vehicle 2 has arrived at the pick-up area Ab.

Meanwhile, if "t3≤TH2" does not hold in step S117 of FIG. 7, that is, if the user is expected to arrive late, the controller 11, proceeding to step S118, instructs the vehicle 2 to return to the parking lot Ap.

Then, in step S119, the controller 11 determines whether the user arrival time t3 upon rescheduling is no greater than "predicted vehicle arrival time T1+margin α" (whether "t3≤T1+α" holds).

The predicted vehicle arrival time T1 is calculated on the basis of the distance from the parking lot Ap to the pick-up area Ab (hereinafter, referred to as "the distance to the pick-up area Ab") and the vehicle traveling speed. Specifically, the predicted vehicle arrival time T1 is calculated from "distance to pick-up area Ab/vehicle traveling speed."

As the distance to the pick-up area Ab, the distance from the parking spot of the vehicle 2 that is instructed to move in step S118 to the pick-up area Ab is used in this example. As described above, in this example, the controller 11 has a grasp of the parking spot of the vehicle 2 to be called.

As the vehicle traveling speed, a value common to all the vehicles 2 can be used, or values corresponding to respective vehicles 2 can be used. In this example, for the value of the vehicle traveling speed, a value common to all the vehicles 2, such as 15 km/h (a speed at which a vehicle can safely travel on the passage) is used.

Alternatively, in calculating the distance to the pick-up area Ab, the position of the vehicle 2 may be acquired, and the distance from that position to the pick-up area Ab can be calculated.

If "t3≤T1+α" does not hold in step S119, in step S120, the controller 11 decrements the value of the predicted user arrival time t3 upon rescheduling and executes the determination processing of step S119 again.

If "t3≤T1+margin α" holds, the controller 11, proceeding to step S121, instructs the vehicle 2 to move again to the pick-up area Ab.

In this example, the margin α is used in determining the timing at which the vehicle 2 starts moving again to the pick-up area Ab on the basis of the predicted user arrival time t3 upon rescheduling and the predicted vehicle arrival time T1 for the vehicle 2 that has been instructed to move to the pick-up area Ab. The margin α functions as an offset value that allows the vehicle 2 to pick up the user at the pick-up area Ab (i.e., the vehicle 2 can arrive at the pick-up area Ab a little earlier than the user). The margin α is set to a duration of, for example, 3 to 5 minutes to prevent the duration in which the vehicle 2 occupies the pick-up area Ab from being extended excessively.

Then, if it is determined in step S113 that the refuge area permitted time has expired or if it is determined in step S114 that the number of vehicles taking refuge in the temporary refuge area Ae is no smaller than "x," in step S122, the controller 11 instructs the vehicle 2 to return to the parking lot Ap. Then, in step S123, the controller 11 notifies the user of the return to the parking lot Ap and returns to step S100 of FIG. 6.

The user in this case, that is, the user who neither arrives at the pick-up area Ab even after a relatively long time has passed after making the call nor responds to the rescheduling request needs to make a call again to have the vehicle 2 pick up the user. If a call is made again, the processing in step S101 and thereafter is executed again.

5. Acquiring Moving Speed of User

As described above, for the user moving speed Uv, a value based on information that the vehicle 2 has learned about the moving speed of the user can be used.

For example, the user moving speed Uv can be a value of a mean moving speed of the user that the vehicle 2 has learned. In this case, the vehicle 2 calculates the mean moving speed on the basis of the duration from when the user makes a call to when the user actually arrives at the pick-up area Ab and the distance from the point where the call is made to the pick-up area Ab. Specifically, each time the establishment to which the pick-up system is applied is used, the vehicle 2 acquires, from the control device 1, the moving distance of the user (the distance from the user position acquired when the call is made to the pick-up area Ab) and the time required for the user to arrive at the pick-up area Ab from where the call is made and calculates the mean moving speed of the user on the basis of the sum total of the moving distance of the user and the sum total of the time required for the user to move that distance. "The establishment to which the pick-up system is applied" is a not limited to a single establishment and is a concept that includes a plurality of establishments.

In this case, the control device 1 acquires the mean moving speed of the user that the vehicle 2 has learned as described above as "the user moving speed Uv." Alternatively, the control device 1 may acquire, as the user moving speed Uv, a value obtained by multiplying the user walking speed having a fixed value by a coefficient corresponding to the acquired mean moving speed of the user.

The control device 1 in this case calculates the moving distance of the user and measures the time required for the move each time a call is made by the user and transmits these pieces of information to the vehicle 2 to be called.

Alternatively, the information that the vehicle 2 learns about the user moving speed Uv can be, more roughly, information as to whether the user moves at a low speed. For example, the user who frequently receives the rescheduling request described above can be estimated to be a user who tends to move at a lower speed. Therefore, for example, the control device 1 that has made a rescheduling request to the user notifies the vehicle 2 to that effect, and the vehicle 2 generates, as moving speed correlation information, information indicating the frequency at which the rescheduling request has been made (e.g., the number of instances the rescheduling request has been made/the frequency the establishment is used).

When a call is made by the user, the control device 1 acquires the moving speed correlation information from the vehicle 2 to be called and acquires the user moving speed Uv by multiplying the user walking speed having a fixed value by a coefficient corresponding to the acquired moving speed correlation information, for example.

The information as to the magnitude of the user moving speed to be learned by the vehicle 2 is not limited to information indicating two levels of "high" and "low" and can be information indicating three or more levels.

In the foregoing example, the information indicating the stepwise magnitude of the user moving speed is generated on the basis of the number of instances the rescheduling request is made. Alternatively, the information can be generated through any other method. For example, the information can be generated on the basis of the mean moving speed of the user described above. In a case in which the information is generated on the basis of the number of instances the rescheduling request is made as illustrated above, a processing load on the control device 1 for calculating the moving distance of the user to the pick-up area Ab or for measuring the time required for the move can be reduced.

The user moving speed Uv can be a value that takes into consideration whether it is a time period busy with customers (e.g., a time period in which the customers need to wait longer than usual for an elevator) or whether it is an establishment that tends to be crowded. For example, if it is a busy time period or a busy establishment, a value obtained by subtracting a predetermined value from the user walking speed having a fixed value (or a value obtained by multiplying the user walking speed having a fixed value by a coefficient to produce a lower speed) can be acquired as the user moving speed Uv.

The user moving speed Uv can be calculated on the basis of the amount or the size of merchandise purchased by the user at the establishment. For example, the amount or the size of the purchased merchandise can be estimated on the basis of the type of the store where the merchandise is purchased and information on the purchase price at the store.

In this example, the mobile terminal 3 has a function of making a payment with electronic money as described above, and the information on the purchase price is estimated from the information on the monetary amount paid with electronic money. In other words, the mobile terminal 3 in this case transmits the information on the paid monetary amount to the control device 1 when the payment is made with electronic money. The control device 1 estimates the type of the store where the merchandise is purchased by acquiring the positional information of the mobile terminal 3 held when the merchandise is purchased (when the payment is made with electronic money). For each user, the control device 1 holds, as purchase management information, information on the type of the store where merchandise is purchased and the monetary amount paid at that store (monetary amount paid for the purchase). When the user calls for a vehicle, the control device 1 calculates, as "an amount and size correlation value," the value correlating to the amount and the size of the purchased merchandise on the basis of the purchase management information. This amount and size correlation value is calculated basically such that the value is greater when merchandise is purchased at a store that sells large-size merchandise and such that the value is greater as the monetary amount paid for the purchase is greater.

The control device 1 in this case acquires the user moving speed Uv of the user who has made a call on the basis of the user walking speed having a fixed value and the amount and size correlation value, for example. Specifically, the value of the user walking speed is corrected such that the user moving speed Uv is lower as the amount and size correlation value is greater (i.e., as the amount and the size of purchased merchandise are greater).

Thus, the user moving speed Uv that appropriately corresponds to the amount and the size of the baggage carried by the user can be acquired, and the vehicle 2 can be moved to the pick-up area Ab at a more appropriate timing. In other words, the duration in which the vehicle 2 that has arrived at the pick-up area Ab occupies the pick-up area Ab while waiting for the user to arrive can be reduced, and the possibility that the congestion at the pick-up area Ab is eased can be increased.

The user moving speed Uv can be a value that is based on the passenger composition of the vehicle 2. For example, when the passengers include a child, a lower user moving speed Uv can be used. Whether the passengers include a child can be determined on the basis of information indicating the presence of a child safety seat to be mounted in the vehicle 2, for example.

Alternatively, it is conceivable to lower the user moving speed Uv as the number of passengers increases. The number of passengers in the vehicle 2 is acquired from the information on the number of sitting passengers obtained from the vehicle 2 (e.g., the number of sitting passengers at the time when the vehicle 2 arrives at the drop-off area). Whether the passengers are sitting in the vehicle 2 can be detected by a sitting sensor provided in a seat (e.g., pressure-sensitive sensor) or on the basis of an image captured by a camera that captures an image inside the vehicle compartment.

6. Modifications

The moving vehicle selection processing (S107) illustrated in FIG. 8 can also be modified as illustrated in FIG. 11.

The difference of the moving vehicle selection processing illustrated in FIG. 11 from the processing illustrated in FIG. 8 is that step S301 is provided between step S205 and step S206.

In this case, upon calculating the predicted user arrival time T in step S205, in step S301, the controller 11 determines whether the predicted user arrival time t of the candidate vehicle is no greater than a threshold value THt. If the predicted user arrival time t is greater than the threshold value THt, the controller 11 executes the determination processing of step S206. Specifically, the moving candidate vehicle is selected as the moving target vehicle if "t>T−τ" holds. Meanwhile, if the predicted user arrival time t is no greater than the threshold value THt, the controller 11 skips the determination processing of step S206 and terminates the moving vehicle selection processing of step S107.

If the moving candidate vehicle is selected as the vehicle to be moved out of the pick-up area Ab while the value of "t" is very small, such as 30 seconds (i.e., the user is near the pick-up area Ab), the user may arrive at the pick-up area Ab and may be made to wait for a relatively long time until the vehicle arrives while the moving candidate vehicle enters the pick-up area Ab again.

According to the processing illustrated in FIG. 11, the moving candidate vehicle is not selected when the value of "t" is no greater than the threshold value THt regardless of whether "t>T−τ" holds. Therefore, the user of the moving candidate vehicle can be prevented from being made to wait unnecessarily as described above.

In the foregoing, to determine whether the vehicle 2 has arrived at the pick-up area Ab (hereinafter, referred to as arrival determination processing), it is determined whether an arrival notification is received from the vehicle 2. Alternatively, in the arrival determination processing, for example, if a gate is provided at the entrance of the pick-up area Ab, a sensor, such as a camera, that can acquire information on the license plate of the vehicle 2, for example, may be provided, and whether the target vehicle 2 has arrived at the entrance may be determined on the basis of the acquired license plate information. In this case, the user sets the license plate information in advance in the application for the pick-up system, and the control device 1 acquires the license plate information from the mobile terminal 3 in response to a call from the user, for example. Thus, the control device 1 can determine whether the vehicle that has arrived at the gate is the target vehicle 2.

In the foregoing, the assumption is that the pick-up system according to the present example is applied to an automated valet parking system and the vehicle 2 moves to or parks itself in the parking lot Ap through autonomous driving. Alternatively, the pick-up system according to the example can be suitably applied to a case in which the vehicle 2 is moved to the parking lot Ap and/or is parked in a parking spot as the driver drives the vehicle 2.

7. Recapitulation of Examples

As described above, a control device (control device 1) according to an example is configured to cause a vehicle (vehicle 2) parked in a parking lot (parking lot Ap) to move to a pick-up area (pick-up area Ab) in accordance with a call from a user who is a passenger. The control device may may serve as a "predicted time calculator" (controller 11: S202 and S203) configured to, with regard to the vehicle that has arrived at the pick-up area in response to the call, acquire a user position and calculate a predicted user arrival time (predicted user arrival time t) on the basis of the user position, the user position being a current position of the user who has made the call for the vehicle, the predicted user arrival time being a time in which the user is predicted to arrive at the pick-up area; and a "moving-out vehicle determiner" (controller 11: S204 to S207) configured to determine a moving-out vehicle (moving target vehicle) on the basis of the predicted user arrival time calculated by the predicted time calculator, the moving-out vehicle being a vehicle that is to be moved out of the pick-up area.

This configuration makes it possible to cause, among vehicles that have arrived at the pick-up area, a vehicle of which the user arrival time is predicted to be late to move out of the pick-up area.

Therefore, the vehicle that has arrived at the pick-up area can be prevented from occupying the pick-up area for a long time while waiting for the user to arrive, and any congestion at the pick-up area can be eased.

In the control device according to the example, the moving-out vehicle determiner determines the moving-out vehicle from an allowed time expired vehicle (identified vehicle), the allowed time expired vehicle being a vehicle for which an allowed waiting time for boarding at the pick-up area has expired (S201 to S207).

This configuration makes it possible to determine the vehicle of which the waiting time at the pick-up area is long to be the moving-out vehicle. In other words, the vehicle causing the congestion at the pick-up area can be determined to be the moving-out vehicle.

Accordingly, any congestion at the pick-up area can be eased.

In the control device according to the example, the moving-out vehicle determiner, in a case in which the allowed time expired vehicle is present in the pick-up area and a vehicle behind to enter is present, determines the allowed time expired vehicle to be the moving-out vehicle under a condition in which $t>T-\tau$ holds ($\tau$ is any given number), the vehicle behind to enter being a vehicle that is scheduled to enter the pick-up area in response to a call, T denoting the predicted user arrival time calculated for the vehicle behind to enter, t denoting the predicted user arrival time of the allowed time expired vehicle (S206).

Thus, when there is a vehicle behind to enter the pick-up area, even if the predicted user arrival time (T) of the vehicle behind to enter is longer than the predicted user arrival time (t) of the allowed time expired vehicle in the pick-up area, as long as the difference therebetween is less than a value expressed by "$\tau$," the allowed time expired vehicle in the pick-up area is determined to be the moving-out vehicle.

The allowed time expired vehicle is a vehicle remaining in the pick-up area beyond the allowed time, and it is well predictable that the arrival of the user of that vehicle at the pick-up area will be further behind the schedule. Therefore, allowing such a vehicle to continue to wait at the pick-up area is not desirable in terms of suppressing congestion at the pick-up area. In consideration of this point, even if the predicted user arrival time of the vehicle behind to enter is longer than the predicted user arrival time of the allowed time expired vehicle in the pick-up area as described above, as long as the difference therebetween is less than a prescribed value ($\tau$), the allowed time expired vehicle is moved out of the pick-up area.

This makes it possible to increase the possibility that any congestion at the pick-up area can be eased. This also makes it possible to prevent an other traffic blocking state in which the vehicle behind to enter blocks the passage of another vehicle by waiting at the entrance of the pick-up area, for example. In other words, this can prevent a situation in which efficient control is disabled due to the other traffic blocking state.

In the control device according to the example, the moving-out vehicle determiner refrains from determining the moving-out vehicle when a value of the t is no greater than a predetermined value regardless of whether $t>T-\tau$ holds (modification illustrated in FIG. 11).

If the allowed time expired vehicle is determined to be the vehicle to be moved out of the pick-up area when the value of "t" (the predicted user arrival time of the allowed time expired vehicle) is very small, such as 30 seconds (i.e., the user is near the pick-up area), the user may arrive at the pick-up area and may be made to wait for a relatively long time until the vehicle arrives while the allowed time expired vehicle enters the pick-up area again.

The configuration described above makes it possible to prevent the user of the allowed time expired vehicle from waiting unnecessarily as described above.

In the control device according to the example, the moving-out vehicle determiner determines, when a plurality of vehicles are present in the pick-up area, a vehicle of which the predicted user arrival time is the latest to be the moving-out vehicle (S204).

This configuration makes it possible to prevent a vehicle of which the user waiting time at the pick-up area is short and that may not have any influence on the congestion at the pick-up area from being determined to be the moving-out vehicle.

Accordingly, the functionality of the pick-up system can be increased.

The control device according to the example further includes a refuge instructing unit (controller 11: S110) configured to instruct the vehicle determined to be the moving-out vehicle to move to a temporary refuge area (temporary refuge area (Ae); a requesting unit (controller 11: S111) configured to request the user of the moving-out vehicle to issue a scheduling instruction with regard to an arrival time at the pick-up area; and a re-moving instructing unit (controller 11: S121) configured to instruct the moving-out vehicle to move to the pick-up area in accordance with the scheduling instruction from the user issued in response to the request.

Causing the moving-out vehicle to take refuge at the temporary refuge area that is different from the parking lot allows the moving-out vehicle to wait outside the pick-up area without making the moving-out vehicle wait on the passage or causing the moving-out vehicle to return to the parking lot. In addition, according to the configuration described above, when a schedule regarding a pick-up area arrival time is instructed from the user of the moving-out vehicle, the moving-out vehicle is allowed to re-enter the pick-up area at the timing corresponding to the schedule.

This, therefore, makes it possible to achieve a pick-up system with high functionality that can reduce the user's waiting time for boarding by preventing the user from being made to wait unnecessarily as the moving-out vehicle is returned to the parking lot and that can reduce the user's waiting time for boarding by causing the moving-out vehicle to move again to the pick-up area in accordance with the schedule instructed by the user.

In the control device according to the example, the predicted time calculator calculates the predicted user arrival time on the basis of the user position and a user moving speed and uses, as the user moving speed, a value that is based on information that the vehicle has learned about a moving speed of the user.

Thus, the information that the vehicle has learned about the moving speed of the user is reflected on the moving speed of the user to be used in calculating the predicted user arrival time.

Therefore, the accuracy of the predicted user arrival time can be improved, and the possibility of easing the congestion at the pick-up area can be increased.

As described above, according to the present example and the modifications, a vehicle that has arrived at the pick-up area can be prevented from occupying the pick-up area for a long time while waiting for the user to arrive, and any congestion at the pick-up area can be eased.

The invention claimed is:

1. A control device configured to cause a vehicle parked in a parking lot to move to a pick-up area in accordance with a call from a user who is a passenger of the vehicle, the control device comprising:
   a predicted time calculator configured to, with regard to the vehicle that has arrived at the pick-up area in response to the call, acquire a user position and calculate a predicted user arrival time on a basis of the user position, the user position being a current position of the user who has made the call for the vehicle, the predicted user arrival time being a time in which the user is predicted to arrive at the pick-up area; and a moving-out vehicle determiner configured to determine a moving-out vehicle on a basis of the predicted user arrival time calculated by the predicted time calculator, the moving-out vehicle being a vehicle that is to be moved out of the pick-up area, wherein the moving-out vehicle determiner determines the moving-out vehicle from an allowed time expired vehicle, the allowed time expired vehicle being a vehicle for which an allowed waiting time for boarding at the pick-up area has expired, and wherein the moving-out vehicle determiner, in a case in which the allowed time expired vehicle is present in the pick-up area and a vehicle behind to enter is present, determines the allowed time expired vehicle to be the moving-out vehicle under a condition in which $t > T - \tau$ holds ($\tau$ is any given number), the vehicle behind to enter being a vehicle that is scheduled to enter the pick-up area in response to another call, T denoting a predicted user arrival time calculated for the vehicle behind to enter, t denoting the predicted user arrival time of the allowed time expired vehicle.

2. The control device according to claim 1, wherein the moving-out vehicle determiner refrains from determining the moving-out vehicle when a value of the t is no greater than a predetermined value regardless of whether $t > T - \tau$ holds.

3. The control device according to claim 1, wherein the moving-out vehicle determiner determines, when a plurality of vehicles is present in the pick-up area, a vehicle of which a predicted user arrival time is the latest of the plurality of vehicles to be the moving-out vehicle.

4. The control device according to claim 2, wherein the moving-out vehicle determiner determines, when a plurality of vehicles is present in the pick-up area, a vehicle of which a predicted user arrival time is the latest of the plurality of vehicles to be the moving-out vehicle.

5. The control device according to claim 1, further comprising:
a refuge instructing unit configured to instruct the vehicle determined to be the moving-out vehicle to move to a temporary refuge area;
a requesting unit configured to request the user of the moving-out vehicle to issue a scheduling instruction with regard to an arrival time at the pick-up area; and
a re-moving instructing unit configured to instruct the moving-out vehicle to move to the pick-up area in accordance with the scheduling instruction from the user issued in response to the request.

6. The control device according to claim 2, further comprising:

a refuge instructing unit configured to instruct the vehicle determined to be the moving-out vehicle to move to a temporary refuge area;
a requesting unit configured to request the user of the moving-out vehicle to issue a scheduling instruction with regard to an arrival time at the pick-up area; and
a re-moving instructing unit configured to instruct the moving-out vehicle to move to the pick-up area in accordance with the scheduling instruction from the user issued in response to the request.

7. The control device according to claim 1, wherein the predicted time calculator calculates the predicted user arrival time on a basis of the user position and a user moving speed and uses, as the user moving speed, a value that is based on information that the vehicle has learned about a moving speed of the user.

8. The control device according to claim 2, wherein the predicted time calculator calculates the predicted user arrival time on a basis of the user position and a user moving speed and uses, as the user moving speed, a value that is based on information that the vehicle has learned about a moving speed of the user.

9. A control device configured to cause a vehicle parked in a parking lot to move to a pick-up area in accordance with a call from a user who is a passenger of the vehicle, the control device comprising:
circuitry configured to:
with regard to the vehicle that has arrived at the pick-up area in response to the call, acquire a user position and calculate a predicted user arrival time on a basis of the user position, the user position being a current position of the user who has made the call for the vehicle, the predicted user arrival time being a time in which the user is predicted to arrive at the pick-up area, and
determine a moving-out vehicle on a basis of the predicted user arrival time calculated by the predicted time calculator, the moving-out vehicle being a vehicle that is to be moved out of the pick-up area,
wherein the moving-out vehicle is determined from an allowed time expired vehicle, the allowed time expired vehicle being a vehicle for which an allowed waiting time for boarding at the pick-up area has expired, and
wherein in a case in which the allowed time expired vehicle is present in the pick-up area and a vehicle behind to enter is present, the allowed time expired vehicle is determined to be the moving-out vehicle under a condition in which $t > T - \tau$ holds ($\tau$ is any given number), the vehicle behind to enter being a vehicle that is scheduled to enter the pick-up area in response to another call, T denoting a predicted user arrival time calculated for the vehicle behind to enter, t denoting the predicted user arrival time of the allowed time expired vehicle.

* * * * *